(12) United States Patent
Glaser et al.

(10) Patent No.: US 9,904,653 B2
(45) Date of Patent: Feb. 27, 2018

(54) SCALED PCI EXPRESS CREDITS

(71) Applicant: Nvidia Corporation, Santa Clara, CA (US)

(72) Inventors: Steve Glaser, Santa Clara, CA (US); Chris Runhaar, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 237 days.

(21) Appl. No.: 14/830,042

(22) Filed: Aug. 19, 2015

(65) Prior Publication Data

US 2017/0052924 A1 Feb. 23, 2017

(51) Int. Cl.
*G06F 3/00* (2006.01)
*G06F 13/42* (2006.01)
*G06F 13/36* (2006.01)
*G06F 13/40* (2006.01)

(52) U.S. Cl.
CPC .......... *G06F 13/4282* (2013.01); *G06F 13/36* (2013.01); *G06F 13/4027* (2013.01); *G06F 13/4068* (2013.01)

(58) Field of Classification Search
None
See application file for complete search history.

(56) References Cited

U.S. PATENT DOCUMENTS

| | | | | |
|---|---|---|---|---|
| 7,698,478 B2* | 4/2010 | Wang | ...................... | G06F 13/28 710/29 |
| 7,702,827 B2* | 4/2010 | Biran | .................. | G06F 13/4282 709/236 |
| 8,139,575 B2* | 3/2012 | Biran | .................. | G06F 13/4282 370/230 |
| 2007/0171830 A1* | 7/2007 | Vulkan | ................. | H04J 3/0632 370/235 |

* cited by examiner

*Primary Examiner* — Idriss N Alrobaye
*Assistant Examiner* — Richard B Franklin
(74) *Attorney, Agent, or Firm* — Rich Domingo; Parker Justiss, P.C.

(57) ABSTRACT

The disclosure provides a PCI Express Scaled Port, a computing device and a method of communicating between PCI Express components. In one embodiment, the PCI Express Scaled Port includes: (1) an interface configured to communicate flow control negotiating packets with another PCI Express Port and (2) a FCC Controller configured to generate the flow control negotiating packets, wherein the flow control negotiating packets include a flow control credit for PCI Express packets and a scaling factor for the flow control credit.

20 Claims, 3 Drawing Sheets

SCALED PCI EXPRESS CREDITS

TECHNICAL FIELD

This application is directed, in general, to communications between computing devices or components and, more specifically, to communications between Peripheral Component Interconnect (PCI) Express devices.

BACKGROUND

PCI Express provides a general purpose interconnect for computing and communicating platforms. PCI Express components communicate over a point-to-point communication channel known as a Link that provides a connection between PCI Express Ports located in each PCI Express component. Packets, such as Transaction layer packets (TLPs), are communicated over the Link according to the PCI Express protocol.

The PCI Express components communicate the packets according to a flow control accounting scheme that is credit based. The flow control credit scheme tracks queue/buffer space available in a receiving PCI Express component in order to prevent overflow of the receiving component buffers and to enable compliance with the PCI Express protocol. The PCI Express protocol requires each PCI Express component to implement credit-based link flow control for each Virtual Channel (VC) on each Port. VCs provide a means to support multiple independent logical data flows over common physical resources of a Link. As such, different data flows can be multiplexed onto a single physical Link. Management of the PCI Express virtual channels and flow control are carried out in the Transactional Layer of the PCI Express architecture.

The PCI Express flow control credit scheme is used to guarantee that a transmitting PCI Express component (a Transmitter) will not send TLPs that a PCI Express receiving component (a Receiver) cannot accept. The PCI Express flow control also helps enable compliance with the ordering rules of PCI Express by maintaining separate flow control buffers and credit pools for the different virtual channels that are maintained for Posted, Non-posted and completion type PCI Express transactions. A PCI Express device maintains six separate flow control credit counters for both header and data for each of the three types of TLPs. Flow control credits are returned from the Receiver to the Transmitter periodically, as the Receiver frees buffer space for each respective packet type.

The PCI Express flow control is done on a per-hop basis wherein flow control information is conveyed between the two components of a Link using Flow Control Packets (FCPs). FCPs are PCI Express Data Link Layer Packets (DLLPs) used to send flow control information, including negotiations and updates, from the Transaction Layer in one PCI Express component to the Transaction Layer in another PCI Express component.

Existing FCPs include data fields that represent the type of credit (posted, non-posted or completion), the type of DLLP (InitFC1, InitFC2 and UpdateFC), the ID of the virtual channel (VC ID) and the header and data flow control credit values. A DLLP is a PCI Express packet that is used to support Link management functions and is generated in the Data Link Layer of the PCI Express architecture.

SUMMARY

In one aspect, the disclosure provides a PCI Express Scaled Port. In one embodiment, the PCI Express Scaled Port includes: (1) an interface configured to communicate flow control negotiating packets with another PCI Express Port and (2) a Flow Control Credit (FCC) Controller configured to generate the flow control negotiating packets, wherein the flow control negotiating packets include a flow control credit for PCI Express packets and a scaling factor for the flow control credit.

In another aspect, the disclosure provides a method of communicating between PCI Express components. In one embodiment, the method includes: (1) determining if scaled flow control credits are supported by both a PCI Express transmitting component and a PCI Express receiving component, (2) determining a scaling factor for the scaled flow control credits if supported by both the PCI Express transmitting component and the PCI Express receiving component and (3) communicating PCI Express packets between the PCI Express transmitting component and the PCI Express receiving component employing the scaling factor.

In yet another aspect, the disclosure provides a computing device. In one embodiment the computing device includes: (1) a processor and (2) a PCI Express Scaled Port coupled to the processor. The PCI Express Scaled Port having: (2A) an interface configured to communicate Scaled Flow Control Packets (SFCPs) with another PCI Express Port and (2B) a FCC Controller configured to generate the SFCPs, wherein the SFCPs include a flow control credit for PCI Express packets and a scaling factor for the flow control credit.

BRIEF DESCRIPTION

Reference is now made to the following descriptions taken in conjunction with the accompanying drawings, in which.

DETAILED DESCRIPTION

The existing PCI Express platform includes up to 127 outstanding header credits and up to 2047 outstanding data credits. The objective for each PCI Express connection is to saturate the Link between the PCI Express components with packets. However, as transmission bandwidth increases, existing PCI Express platforms are running into limits. This occurs when the existing flow control mechanisms cannot convey enough credits to cover the round trip time of the Link. Round trip time is the minimum time from when a transmitter sends a TLP until it can receive a FCP returning the credits that were consumed by that TLP. The total number of credits available needs to be sufficient to cover the maximum amount of data that a transmitter could send during the round trip credit latency.

It is realized herein that a flow control negotiation mechanism is needed for PCI Express systems that permit greater flow control credit values to enable saturation of Links as Link bandwidth increases. It is also realized herein the need to comply with existing PCI Express formats or connections when employing the greater flow control credit values.

Accordingly, the disclosure provides a Scaled Flow Control Packet (SFCP) that uses scaled PCI Express flow control credits to provide greater flow control credit values. The disclosed SFCP complies with the format of a conventional FCP that does not use scaling, which is referred to herein as a Non-Scaled Flow Control Packet (NSFCP). Thus, the disclosure provides a new FCP, a SFCP. The disclosure also provides a scaled credit negotiating scheme that determines if the receiving PCI Express component can accept scaled credits. As such, the disclosed scaled credits allow greater credit values to prevent "stalling" on a PCI Express Link and yet still work with non-scaled PCI Express Ports.

Figure 1:
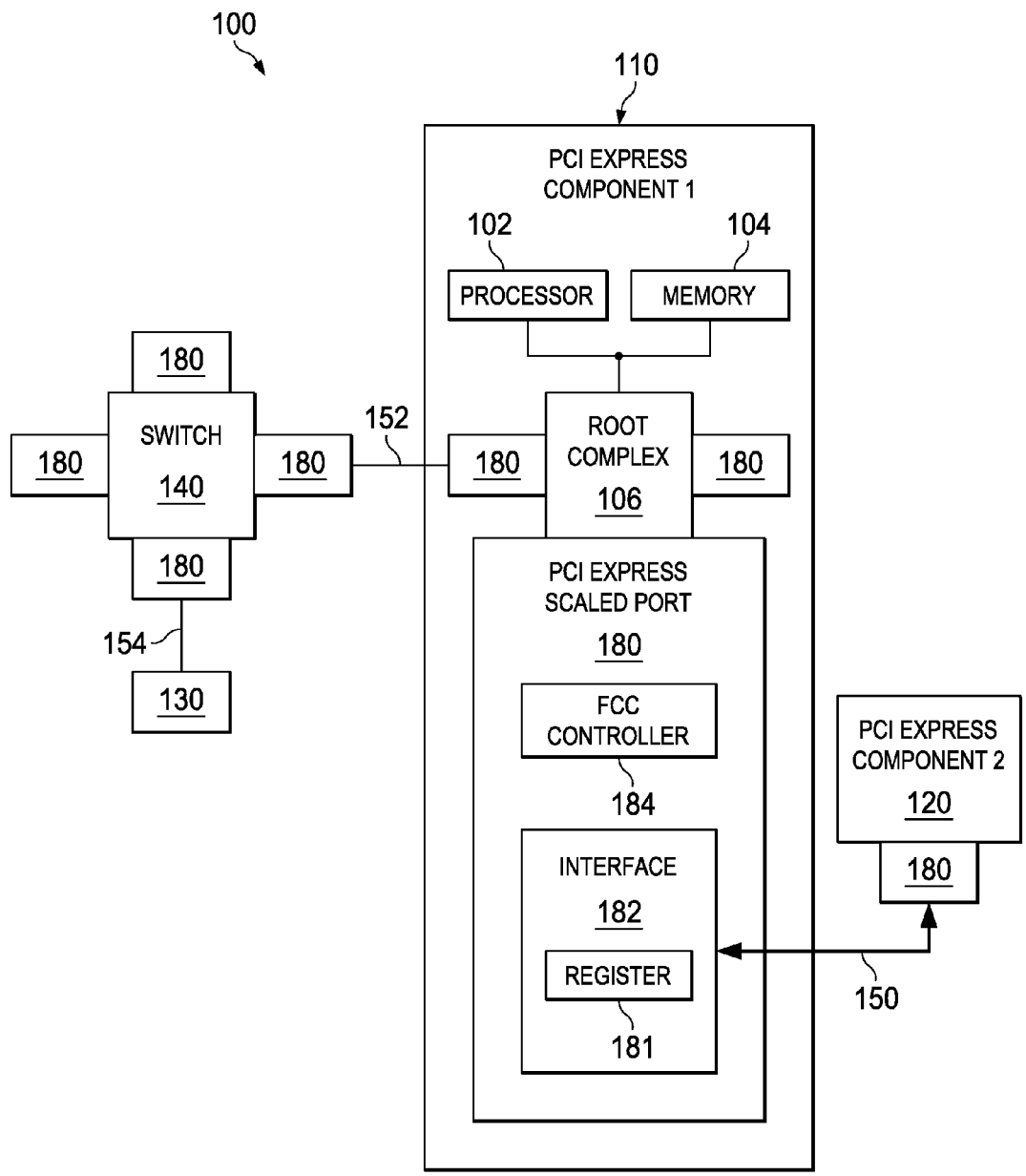
FIG. 1 illustrates a block diagram of an embodiment of a PCI Express system constructed according to the principles of the disclosure.

Turning now to FIG. 1, illustrated is a block diagram of an embodiment of a PCI Express system 100 constructed according to the principles of the disclosure. The PCI Express system 100 includes a PCI Express component 1 (first component) 110, a PCI Express component 2 (second component) 120, a switch 140 and a Non-Scaled PCI Express Port 130. The PCI Express system 100 also includes Links 150, 152, 154 that connect the first component 110 to the second component 120, the first component to the switch 140 and the switch to the Non-Scaled PCI Express Port 130, respectively. One skilled in the art will understand that the PCI Express system 100 can include additional components as those illustrated and can also include different components such as a PCI Express bridge.

The first component 110 can be, for example, a computing device such as a personal computer, a laptop, a tablet, a smartphone, a GPU, a CPU, or an embedded processor. The first component 110 is connected to other components or devices via PCI Express interconnects. The first component 110 includes a processor 102, a memory 104, a root complex 106 and PCI Express Scaled Ports (PESPs) 180.

The processor 102 and the memory 104 are conventional components that are configured to cooperate to provide the functionality of the first component 110. For example, if a GPU, the processor 102 and memory 104 cooperate to provide graphic processing. The root complex 106 is connected to the processor 102 and the memory 104 through a local bus and is configured to connect to PCI Express components via the PESPs 180. The root complex 106 is configured to generate transaction requests on behalf of the processor 102 and can be implemented as a discrete device as illustrated or may be integrated with the processor 102. As illustrated, a root complex may contain multiple PESPs 180 for connections.

Each of the PESPs 180 includes an interface 182 and a Flow Control Credit (FCC) Controller 184. As shown, a single one of the PESPs 180 is expanded to show the interface 182 and the FCC 184 and represent the other PESPs 180. One skilled in the art will understand that the second component 120 can also include multiple of the PESPs 180.

The interface 182 can include a group of transmitters and receivers that define a PCI Express Link. The interface 182 is configured to communicate PCI Express packets, such as FCPs, with other PCI Express Ports, such as the PESP 180 of the second component 120. Thus, the interface 182 is configured to transmit and receive SFCPs and load at least a portion of the data from the SFCPs in a credit register 181 for processing by the FCC controller 184. In one embodiment at least the header credit values and the data credit values from the SFCPs are stored in designated bits of the credit register 181.

The interface 182 is configured to convert information received from the Data Link Layer into an appropriate serialized format and transmit it across the Link 150 at a frequency and width compatible with the second component 120. In one embodiment, the interface 182 includes circuitry for interface operation, including driver and input buffers, registers, parallel-to-serial and serial-to-parallel conversion, PLL(s), and impedance matching circuitry. The interface 182 can also include logical functions related to interface initialization and maintenance.

In one embodiment, each of the PESPs 180 can support up to eight VCs. The VCs are uniquely identified using the VC ID mechanism in a SFCP as disclosed herein. An independent flow control credit pool is maintained for each VC by the FCC controller 184. The FCC controller 184 is configured to manage the flow control credits for the VCs that are employed over the Link 150. The FCC controller 184 is located in the transaction layer of the PCI Express architecture.

The second component 120 can also be a computing device such as a personal computer, a laptop, a tablet, a smartphone, a GPU a CPU, or an embedded processor. As such, the second component 120 can also include a processor 102 and a memory 104 that cooperate to provide a determined functionality. As illustrated, the second component 120 also includes a PESP 180. In contrast, the Non-Scaled PCI Express Port 130 is a conventional PCI Express Port that is not configured for scaling as disclosed herein. Advantageously, the PESPs 180 are compatible with and configured to communicate with the Non-Scaled PCI Express Port 130. Thus, while scaled flow control credits can be used over the Link 150, unscaled flow control credits are employed for the Link 154 since the Non-Scaled PCI Express Port 130 does not support scaled flow control credits. The Non-Scaled PCI Express Port 130 can be part of a computing device.

The switch 140 is configured to connect two or more Ports to allow packets to be routed from one Port to another. From a configuration software viewpoint, the switch 140 appears as a collection of virtual PCI-to-PCI Bridges. The switch 140 includes four PESPs 180. The switch is connected to the first component 110 via the Link 152 and is connected to the Non-Scaled PCI Express Port 130 via the Link 154. Each of the Links 150, 152, 154, can be a conventional Link typically employed in a PCI Express fabric. For example, if the first component 110 is a Transmitter and the second component 120 is a Receiver, traffic that flows through the employed VCs is multiplexed onto the Link 150 by the first component 110 and de-multiplexed into the separate VC paths by the second component 120.

Figure 2:
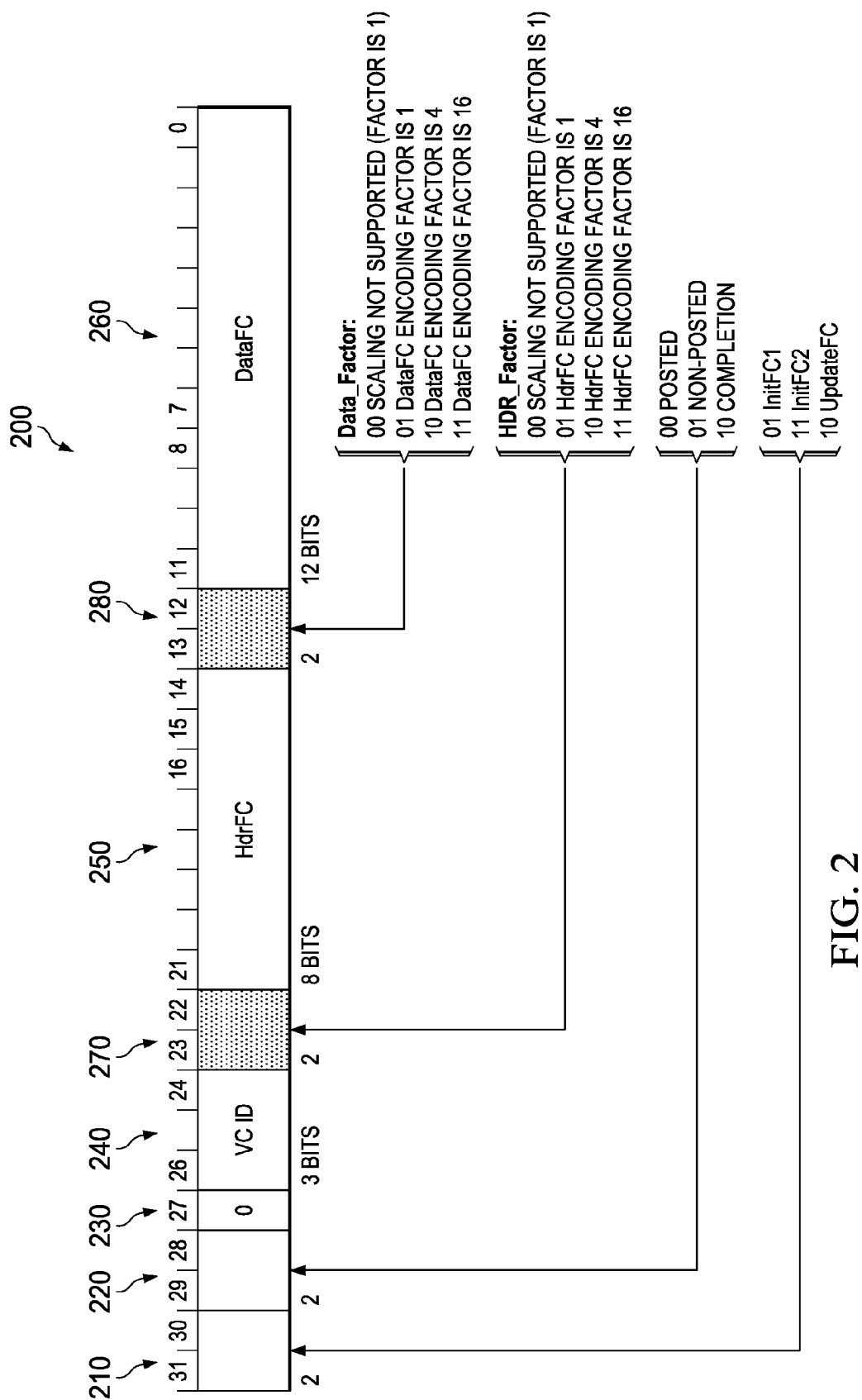
FIG. 2 illustrates a diagram of an embodiment of a Scaled Flow Control Packet (SFCP) having scaling factors according to the principles of the disclosure.

Unlike conventional FCC controllers, the FCC controller 184 is configured to generate the SFCPs as disclosed herein and employ these FCPs to track the flow control credits for VCs. The SFCPs include a flow control credit for PCI Express packets and a scaling factor for the flow control credit. FIG. 2 illustrates an embodiment of a SFCP.

The FCC controller 184 is also configured to establish the size of flow control credit fields in the credit register 181 based on the scaling factors. Table 1 provided below describes the meaning and implications of each of the encoding values for scaling factor values. The size of the register credit field for the flow control credits determined by the FCC controller 184 can correspond to the indicated number of bits in Table 1.

FIG. 2 illustrates a diagram of an embodiment of a scaled flow control mechanism, a SFCP 200, for PCI Express systems having scale fields for header and data flow control credits according to the principles of the disclosure. The SFCP 200 is employed during flow control initialization and periodic updates for VCs. The SFCP 200 includes a total of 32 bits, 0-31. Unlike a NSFCP, however, the SFCP 200 employs scaling factors for scaling header flow control credits and data flow control credits. In one embodiment, each of these scaling factors is used in bit locations that were formerly reserved bits in a NSFCP.

As in a NSFCP, the SFCP 200 includes a flow control packet identifier field 210, flow control transaction type field 220, a zero bit field 230, VC ID field 240, header credit field 250 and data credit field 260. The flow control packet identifier field 210 is a two bit field that is used to indicate the type of flow control packet of the SFCP 200 and to differentiate flow control DLLPs from other DLLPs. As illustrated in FIG. 2, the type of flow control packets can be a first initial flow control packet (InitFC1), a second initial flow control packet (InitFC2), and an update flow control packet (UpdateFC). The InitFC1 and InitFC2 packets are transmitted by a PCI Express transmitting component (i.e., a Transmitter) to convey the buffering available in that component's receiving buffers. The transmitting component initially sends InitFC1 packets, and switches to sending InitFC2 packets when it has received the various InitFC1s sent by the remote end of the Link. After this initial negotiation protocol, UpdateFC packets are used to indicate the number of flow control credits available.

The flow control transaction type field 220 is a two bit field that is used to indicate the type of transaction. As illustrated in FIG. 2, the type of transactions are posted, non-posted and completion. The zero bit field 230 is a single bit field that is reserved for future expansion of the VC ID field. The VC ID field 240 is a three bit field that is used to identify the VC in which the SFCP 200 relates. The header credit field 250 and data credit field 260 are used to indicate the flow control credit values for headers and data, respectively, for the indicated transaction types. The header credit field 250 is eight bits and the data credit field 260 is twelve bits. The size of these fields, in an NSFCP, corresponds to 127 header flow control credits and 2047 data flow control credits, respectively.

The SFCP 200 also includes a header scale field 270 and a data scale field 280. Each of these fields is a two bit field. The header scale field 270 is encoded to indicate if scaling of the header flow control credits is supported or not supported, and if supported, a scaling factor. In one embodiment, if scaling is not supported, the header scale field 270 is encoded with "00." As such, the scaling factor for the header flow control credits in the header credit field 250 is one.

In one embodiment, if scaling is supported, the header scale field 270 is encoded with the scaling factor that is used for the header flow control credits in the header credit field 250. For example, if scaling is supported and the scaling factor is one, the header scale field 270 is encoded with "01." For a scaling factor of four and sixteen, the header scale field 270 is encoded with "10" and "11," respectively. Using a scaling factor of four as an example, if the header credit field 250 has a value of 100, then the total number of header flow control credits available would be 400 (4×100=400). A scaling factor of four would support up to 508 header credits. A scaling factor of sixteen would support up to 2032 header credits.

Similarly, in one embodiment, if scaling is supported, the data scale field 270 is encoded with the scaling factor that is used for the data flow control credits in the data credit field 260. Thus, if scaling is supported and the scaling factor is one, the data scale field 280 is encoded with "01." For a scaling factor of four and sixteen, the data scale field 280 is encoded with "10" and "11," respectively. Using a scaling factor of sixteen as an example, if the data credit field 260 has a value of 2000, then the total number of header flow control credits available would be 32,000 (16×2000=32,000). A scaling factor of four would support up to 8188 data credits. A scaling factor of sixteen would support up to 32,752 data credits. In one embodiment, header scale field 270 and the data scale field 280 must have the same value. To compensate for the larger flow control credit values created by scaling, credit fields of a credit register are widened when scaling is supported. A FCC controller, such as FCC controller 184, is configured to increase the width of the credit fields of a credit register, such as credit register 181, to compensate for the header flow control credit values and data flow control credit values that are greater than the maximum credit values that are presently being used; 127 for the header flow control credit value and 2047 for the data flow control credit value. Accordingly, the credit register 181 can be sized based on the greater flow control credit values due to the use of the scaling factors.

Table 1 below demonstrates how in one embodiment a scaling factor is employed in a PCI Express system employing a SFCP, such as SFCP 200, according to the principles of the disclosure. Table 1 indicates how the SFCP is used to communicate the greater flow control credit values that result from scaling and maintain the format of a NSFCP. As indicated in the Table 1, the credit fields of a credit register are widened to cover the increased credit values and the upper bits of the credit fields are communicated in the header credit fields and the data credit fields of the SFCP. Advantageously the existing field format for a NSFCP can be used for negotiating and updating scaled credit values.

With the disclosed SFCP and FCC controller, the value for a single type of credit remains the same as in conventional PCI Express systems. As such, the value of a header flow control credit remains at one TLP header and the value of a data flow control credit remains at sixteen bytes. Scaling support or non-support is per each VC and is negotiated during the first two flow control credit initiating stages via the packets InitFC1 and InitFC2. The scaling factor can vary for each of the six credit pools of each VC. A Receiver picks the scaling factor if supported and the Transmitter complies.

Table 1 includes eight columns. The first column indicates if scaling of credit values is supported or not supported by the communicating pair of PCI Express components. The second column indicates the scaling factor that is encoded in the header scaling field 270 and the data scaling field 280 of the SFCP 200 based on if scaling is supported and the agreed upon scaling factor determined by the communicating PCI Express components. The third column and the sixth column indicate the number of bits needed in a credit register for the header flow control credit value and the data flow control credit value according to the scaling factor employed from the second column. The fourth and seventh columns of Table 1 indicate the bit locations from the credit register for the header flow control credit values and the data flow control credit values that are loaded into the header credit field 250 and the data credit field 260 of the SFCP 200. The fifth and eighth columns indicate the maximum header credits and the maximum data credits available for the scaling factors of the second column. Since it is not possible to communicate the lower bits of the credit value in the InitFC packets, the lower bits are assumed to be 0.

TABLE 1

Encoding Scaling for a SFCP

| Support | Encoding Factor | HdrFC | DLLP HdrFC: | Max Hdr Credits | DataFC | DLLP DataFC: | Max Data Credits |
|---|---|---|---|---|---|---|---|
| No | 1 | 8 bits | HdrFC[7:0] | 127 | 12 bits | DataFC[11:0] | 2047 |
| Yes | 1 | 8 bits | HdrFC[7:0] | 127 | 12 bits | DataFC[11:0] | 2047 |
| Yes | 4 | 10 bits | HdrFC[9:2] | 507 | 14 bits | DataFC[13:2] | 8187 |
| Yes | 16 | 12 bits | HdrFC[11:4] | 2031 | 16 bits | DataFC[15:4] | 32751 |

As indicated in Table 1, if scaling is not supported, the scaling factor is one and the header flow control credit value is the value in the eight bit header credit field (e.g., header credit field 250 in FIG. 2). Similarly, data flow control credit value is the value in the twelve bit data credit field (e.g., data credit field 260). In this embodiment, if scaling is supported three different scaling factors can be employed. As noted with respect to FIG. 2, these scaling factors can be encoded in the header scaling field 270 and the data scaling field 280 of the SFCP 200. For a scaling factor of one, the header flow control credit value is again the value of the eight bit header credit field. However, unlike when scaling is not supported, the scaling factor of one indicates that the sending Port supports scaling, and will use it if requested by the remote Port.

For a scaling factor of four, the header flow control credit value can be a maximum of four times 127 and the data flow control credit can be a maximum of four times 2047. As such, ten bits and 14 bits need to be reserved in a credit register of a PESP for the different header flow control credit values and data flow control credit values. For a scaling factor of sixteen, 12 bits are needed for the header flow control credit value and sixteen bits are needed for the data flow control credit value. In one embodiment, a FCC controller, such as FCC controller 184, is configured to define the credit register space needed for the different flow control credit values. In some embodiments, the credit registers are located in an interface of a PESP, such as the credit register 181 of the interface 182 of PESP 180.

Figure 3:
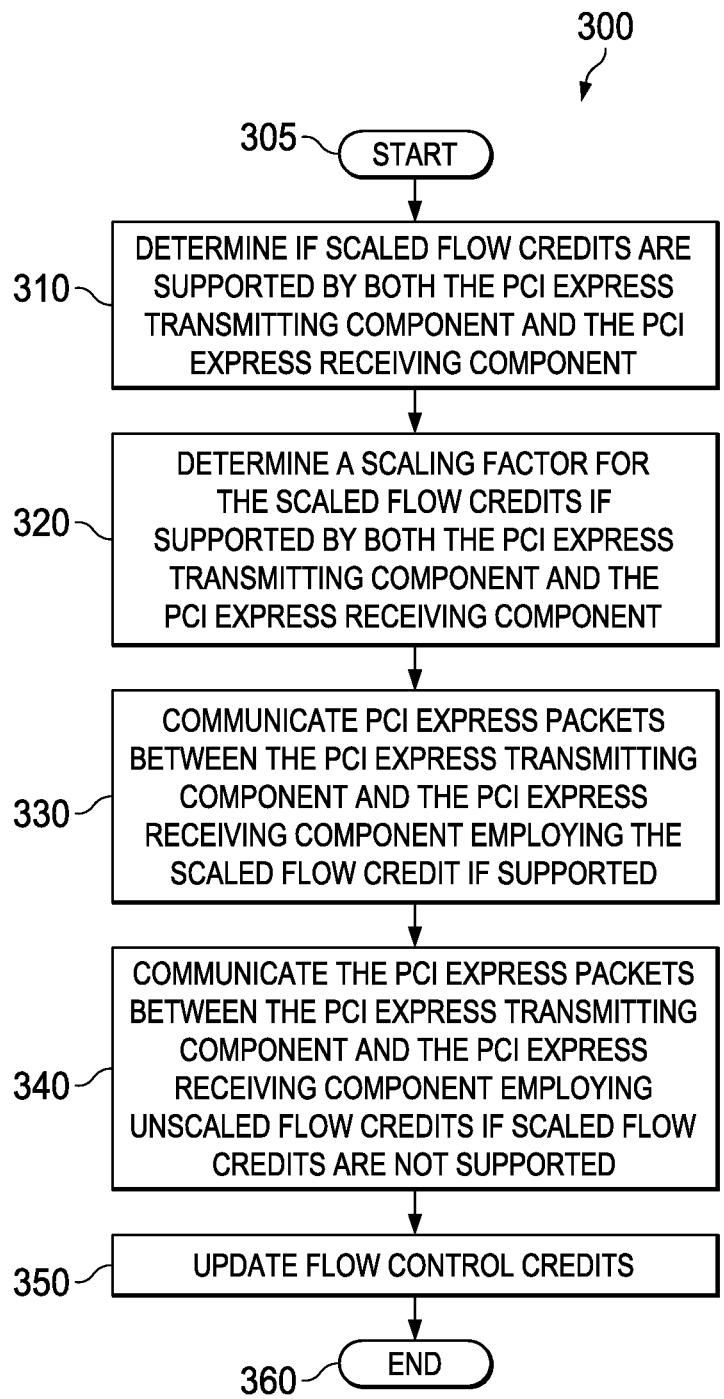
FIG. 3 illustrates a flow diagram of an embodiment of a method of communicating between PCI Express components carried out according to the principles of the disclosure.

FIG. 3 illustrates a flow diagram of an embodiment of a method 300 of communicating between PCI Express components carried out according to the principles of the disclosure. In one embodiment, the method 300 includes flow control initialization for a VC of a PCI Express system. In some embodiments, the method includes the first stage of initialization and the second stage of initialization of the PCI Express VC. The method 300 or at least a part thereof may be carried out by a FCC controller as disclosed herein. The method 300 is for the initialization of a single type of PCI Express transaction. One skilled in the art will understand that a similar initialization process will be performed for all three of the PCI Express transaction types and for each VC being employed in a PCI Express Link. In some embodiments the method 300 can be performed when testing a computing device during manufacturing. The method 300 begins in a step 305 with a PCI Express transmitting component that supports scaling.

In a step 310, a determination is made if scaled flow control credits are supported by both the PCI Express transmitting component and a PCI Express receiving component. In one embodiment, the determining of support includes the PCI Express transmitting component generating SFCPs and sending the SFCPs between the PCI Express components. The SFCPs can be an InitFC1 packet and InitFC2 packet. In one embodiment, the scaled flow control credits include both a header flow control credit and a data flow control credit. The PCI Express transmitting component can set the header scale field and the data scale field of an InitFC1 SFCP to a non-zero number to indicate scaling is supported and to indicate the scaling factor to use on the header flow control credit value and the data flow control credit value of the InitFC1 SFCP. In some embodiments, if the header flow control credit value is non-zero, then the data flow control credit value must also be non-zero. If the PCI Express transmitting component does not support scaled flow control credits, then the header scale field and the data scale field are set to zero. In one embodiment, a header scaling field and a data scaling field of an InitFC1 SFCP and an InitFC2 SFCP are encoded based on support for scaling of flow control credits and, if supported, the scaling factor.

In a step 320, a scaling factor for scaled flow control credits is determined if scaled flow control credits are supported by both the PCI Express transmitting component and the PCI Express receiving component. If the PCI Express receiving component supports scaled flow control, the scaling factors are recorded. The scaling factors for both the scaled header credits and the scaled data credits can be recorded and used for communicating PCI Express packets. Steps 310 and 320 of the method 300 can occur during initialization of a VC between the PCI Express transmitting component and the PCI Express receiving component.

In a step 330, PCI Express packets are communicated between the PCI Express transmitting component and the PCI Express receiving component employing the scaled flow factor if supported. The PCI Express packets can be TLPs.

In a step 340, the PCI Express packets are communicated between the transmitting PCI Express component and the receiving PCI Express component employing unscaled flow control credits if the receiving PCI Express component does not support the scaled flow control credits.

In a step 350, flow control credits are updated during the communication of the PCI Express packets. In some embodiments, precision credit encoding is used for updating flow control credits as discussed below. The communication of updated flow control credits can be performed as with conventional PCI Express systems. If both the PCI Express transmitting component and the PCI Express receiving component support scaled flow control credits, then these components can continue to send non-zero values for the header and data scaling factors. Credits that a transmitting component receives can be encoded per received UpdateFC SFCPs. Credits that a component sends can be encoded per transmitted UpdateFCs SFCPs. If either of the components does not support scaled flow control credits then zero is sent in the header scaling factor and the data scaling factor of the SFCPs when updating. As such, no credits are scaled. The method 300 ends in a step 360.

In some embodiments, start-up flow control credits may be less than the maximum non-scaled supported value (127 for headers and 2047 for data) when the values sent during initialization in the HdrFC and DataFC fields of the Scaled InitFC1s and InitFC2s are interpreted by a component that does not support scaling. For example, a transmitter can send SFCPs to a receiver that does not support scaled flow control credits and the receiver records a flow control credit value that is less than the maximum supported non-scaled credit value. In these instances, after initialization completes, Non-Scaled UpdateFCs may be sent to employ the maximum amount of flow control credits. Table 2 below provides factor resolution encoding employed in one embodiment for credit updates.

TABLE 2

Scaling Factor Resolution Encoding for Flow Control Credit Updates

| | | Sent during InitFC1 | | | |
|---|---|---|---|---|---|
| | | 00 | 01 | 10 | 11 |
| Received during InitFC1 | 00 | TX: 1<br>RX: 1 | TX: 1<br>RX: 1 | TX: 1<br>RX: 1 *** | TX: 1<br>RX: 1 *** |
| | 01 | TX: 1<br>RX: 1 | TX: 1<br>RX: 1 | TX: 1<br>RX: 4 | TX: 1<br>RX: 16 |
| | 10 | TX: 1 ***<br>RX: 1 | TX: 4<br>RX: 1 | TX: 4<br>RX: 4 | TX: 4<br>RX: 16 |
| | 11 | TX: 1 ***<br>RX: 1 | TX: 16<br>RX: 1 | TX: 16<br>RX: 4 | TX: 16<br>RX: 16 |

The fields in Table 2 having "***," represent scenarios when credit values may need to be updated after the completion of credit initialization. For example, the PCI Express transmitting component could send an InitFC1 SFCP with an encoding factor >1 (either a header scaling factor or data scaling factor), and with less than maximum flow control credit values for the header credit values and the data credit values. Additionally, during initialization an InitFC1/2 SFCP is received that indicates scaling is not supported. Accordingly, the flow control credit values initially used during InitFC1/2 would be below the maximum allowed values (i.e., too small). These can be raised as high as 127/2047 for header flow control credit values and data flow control credit values using update NSFCPs. In some scenarios a transmitter does not want to raise them to the limit. For example, if it supports 200 header flow control credits and 1000 data flow control credits, the transmitter might have sent 50/250 with a scaling factor of 4, and will update to 127/1000 using NSFCPs. Thus, after flow control initiation completes, UpdateFC NSFCPs can be sent to grant more credits. This can be done without receiving the TLPs first. If the remote end interpreted the flow control credit values as Encoding Factor 1, then no update is needed to reach the maximum supported header and data credit values as long as they were above the PCI Express specification minimums.

In certain instances, a receiving component can have flow control credits that it cannot advertise to the transmitting component. For example, the encoding factor can be four and a bit location between zero and one of the credit register can have a non-zero value. The header flow control credit values received by the transmitting component, however, corresponds to bit locations two to nine of the credit register (see for example Table One). Thus, the receiving component can have non-zero low bits for the allocated credits that are unadvertised to the transmitting component.

As such, in some embodiments, precision credit encoding is employed. In one embodiment, precision credit encoding employs bits of a header credit field to communicate non-zero lower bits of a data credit register and employs bits of a data credit field to communicate non-zero lower bits of a header credit register. The receiving component can determine when to employ the precision credit encoding. In some embodiments, the FCC controller of a receiving component is configured to determine when to employ precision credit encoding. Turning to FIG. 2, in one embodiment, precision credit encoding for header credits is employed when the header encoding factor is four (i.e., header scaling field 270 is "10"), the data scaling field 280 is "00", and the value of the data credit field 260 contains the low 2 bits of the header credits. Additionally, precision credit encoding for header credits is employed when the header encoding factor is sixteen (i.e., header scaling field 270 is "11"), the header scaling field 280 is "00", and the value of the data credit field 260 contains the low 4 bits of the header credits.

In one embodiment, precision credit encoding for data credits is employed when the encoding factor is four (i.e., data scaling field 280 is "10"), the header scaling field 270 is "00", and the value of the header credit field 250 contains the low 2 bits of the data credits. Additionally, precision credit encoding for data credits is employed when the encoding factor is sixteen (i.e., data scaling field 280 is "11"), the header scaling field 270 is "00", and the value of the header credit field 250 contains the low 4 bits of the data credits.

When the receiving component determines to update data flow control credits with precision credit encoding, an update flow control SFCP can be used wherein bits typically allocated for the header credit field are designated for the lower bits of the data credit register. In one embodiment, if the header scaling field 270 is "00" and the data scaling field 280 is "10," then bits fourteen to fifteen of the SFCP 200 are used to communicate the lower data register bits zero to one. Additionally, if the header scaling field 270 is "00" and the data scaling field 280 is "11," then the SFCP 200 bits fourteen to seventeen are used to communicate the lower data register bits zero to three. As such, the disclosure provides a mechanism for precision credit encoding to update data flow control credits that include non-zero low bits. A low bit refers to the lower bits of a credit register that are not communicated in the designated bits of the header credit fields and the data credit fields of a SFCP with a scaling factor greater than 1. When updating the data flow control credits as described above using precision credit encoding, the header flow control credits are not updated.

However, header flow control credits can be updated using precision credit encoding. For example, if the data scaling factor 280 is "00" and the header scaling factor 270 is "10," then bits zero to one of the SFCP 200 are used to indicate the header credit register bits zero to one. Additionally, if the data scaling factor 280 is "00" and the header scaling factor 270 is "11," then bits zero to three of the SFCP 200 are used to indicate the header credit register bits zero to three. As such, the lower bits of the header credit register can be reported to the transmitting component. When updating the header flow control credits as described above using precision credit encoding, the data flow control credits are not updated.

The above-described methods or at least part thereof may be embodied in or performed by various conventional devices, such as digital data processors, microprocessors or computing devices, wherein these devices are programmed or store executable programs of sequences of software instructions to perform one or more of the steps of the methods, e.g., steps of the method of FIG. 3. The software instructions of such programs may be encoded in machine-executable form on conventional digital data storage media, e.g., magnetic or optical disks, random-access memory (RAM), magnetic hard disks, flash memories, and/or read-only memory (ROM), to enable various types of digital data processors or computing devices to perform one, multiple or all of the steps of one or more of the above-described methods, e.g., one or more of the steps of the method of FIG. 3. Additionally, an apparatus, such as a PCI Express Scaled Port or a Flow Control Credit Controller, may be designed to include the necessary circuitry to perform at least some of the steps of the methods of FIG. 3 and the employment of scaled credit values as disclosed herein.

Portions of disclosed embodiments may relate to computer storage products with a non-transitory computer-readable medium that have program code thereon for performing various computer-implemented operations that embody a part of an apparatus, system or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A Peripheral Component Interconnect (PCI) Express Scaled Port, comprising:
   an interface configured to communicate flow control negotiating packets with another PCI Express Port; and
   a Flow Control Credit (FCC) Controller configured to determine whether a scaled flow control credit is supported by both said PCI Express Scaled Port and said PCI Express Port, and to generate said flow control negotiating packets, wherein said flow control negotiating packets include a flow control credit for PCI Express packets and, when said scaled flow control credit is supported by both said PCI Express Scaled Port and said PCI Express Port, a scaling factor for said flow control credit based on said scaled flow control credit.

2. The PCI Express Scaled Port as recited in claim 1 wherein said flow control negotiating packet is a Scaled Flow Control Packet (SFCP).

3. The PCI Express Scaled Port as recited in claim 2 wherein said SFCP type is either an InitFC1, an InitFC2 or an UpdateFC.

4. The PCI Express Scaled Port as recited in claim 1 wherein said flow control negotiating packet includes a flow control credit for header packets, a flow control credit for data packets, and a scaling factor for each of said header flow control credit and said data flow control credit.

5. The PCI Express Scaled Port as recited in claim 1 wherein said scaling factor corresponds to a type of PCI Express transaction selected from the group consisting of:
   a posted transaction,
   a non-posted transaction, and
   a completion transaction.

6. The PCI Express Scaled Port as recited in claim 1 wherein said scaling factor is for a single virtual channel identified in said FC negotiating packet.

7. The PCI Express Scaled Port as recited in claim 1 wherein said scaling factor employed for transmission is determined by a PCI Express receiving component.

8. The PCI Express Scaled Port as recited in claim 1 wherein said FCC Controller is further configured to update said flow control credit employing precision credit encoding.

9. A method of communicating between Peripheral Component Interconnect (PCI) Express components, comprising:
   determining if scaled flow control credits are supported by both a PCI Express transmitting component and a PCI Express receiving component;
   determining a scaling factor for said scaled flow control credits if supported by both said PCI Express transmitting component and said PCI Express receiving component; and
   communicating PCI Express packets between said PCI Express transmitting component and said PCI Express receiving component employing, when supported, said scaling factor.

10. The method as recited in claim 9 wherein said scaled flow control credits include both a header flow control credit and a data flow control credit.

11. The method as recited in claim 10 wherein said determining if said scaled flow control credits are supported and said determining a scaling factor occur during initialization of a virtual channel between said PCI Express transmitting component and said PCI Express receiving component.

12. The method as recited in claim 11 wherein said determining if said scaled flow control credits are supported includes said PCI Express transmitting component sending an InitFC1 packet, including said scaling factor, to said PCI Express receiving component.

13. The method as recited in claim 9 wherein said determining if said scaled flow control credits are supported and said determining a scaling factor includes generating Scaled Flow Control Negotiation Packets.

14. The method as recited in claim 9 further including updating said scaled flow control credits during said communicating.

15. The method as recited in claim 14 wherein precision credit encoding is employed for said updating.

16. The method as recited in claim 9 further including communicating said PCI Express packets between said transmitting PCI Express component and said receiving PCI Express component employing unscaled flow control credits when said receiving PCI Express component does not support said scaled flow control credits.

17. A computing device, comprising:
   a processor; and
   a Peripheral Component Interconnect (PCI) Express Scaled Port coupled to said processor, including:
   an interface configured to communicate Flow Control Packets (FCPs) with another PCI Express Port; and
   a Flow Control Credit (FCC) Controller configured to generate said FCPs, wherein said FCC Controller determines whether a scaled flow control credit is supported by both said PCI Express Scaled Port and said PCI Express Port, and said FCPs include a flow control credit for PCI Express packets and, when said scaled flow control credit is supported, a scaling factor for said flow control credit, based on said scaled flow control credit.

18. The computing device as recited in claim 17 wherein each of said SFCPs include a flow control credit for header packets, a flow control credit for data packets, a scaling factor for said header flow control credit and a scaling factor for said data flow control credit.

19. The computing device as recited in claim 17 wherein said interface includes a credit register having a size based on said scaling factor.

20. The computing device as recited in claim 17 wherein said FCC Controller is further configured to update said flow control credit employing precision credit encoding.

\* \* \* \* \*